(12) United States Patent
Yokoyama et al.

(10) Patent No.: US 12,468,081 B2
(45) Date of Patent: Nov. 11, 2025

(54) OPTICAL ELEMENT AND VIRTUAL IMAGE DISPLAY DEVICE

(71) Applicant: SEIKO EPSON CORPORATION, Tokyo (JP)

(72) Inventors: Osamu Yokoyama, Shiojiri (JP); Atsushi Saito, Chino (JP); Toshiyuki Noguchi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 666 days.

(21) Appl. No.: 17/876,494

(22) Filed: Jul. 28, 2022

(65) Prior Publication Data

US 2023/0033943 A1 Feb. 2, 2023

(30) Foreign Application Priority Data

Jul. 30, 2021 (JP) .................................. 2021-124981

(51) Int. Cl.
*G02B 5/00* (2006.01)
*G02B 5/32* (2006.01)
*G02B 27/01* (2006.01)

(52) U.S. Cl.
CPC .......... *G02B 5/32* (2013.01); *G02B 27/0172* (2013.01); *G02B 2027/0174* (2013.01); *G02B 2027/0178* (2013.01)

(58) Field of Classification Search
CPC ......... G03H 1/0005; G03H 2001/0077; G03H 2001/0439; G02B 5/32; G02B 27/0172; G02B 2027/0174; G02B 2027/0178
USPC ........................................................... 359/15
See application file for complete search history.

(56) References Cited

U.S. PATENT DOCUMENTS

2022/0011578 A1\* 1/2022 Sinay ................... G02B 27/017

FOREIGN PATENT DOCUMENTS

JP H08184779 7/1996

\* cited by examiner

*Primary Examiner* — Henry Duong
(74) *Attorney, Agent, or Firm* — JCIPRNET

(57) ABSTRACT

An optical element includes a substrate and a first hologram element provided on one side of the substrate, and a second hologram element provided on another side of the substrate. The first hologram element is provided to overlap with the second hologram element in a front view. The first hologram element includes a first hologram layer that diffracts part of incident light in a first wavelength band and that transmits another part of the incident light in the first wavelength band. The second hologram element includes a second hologram layer that diffracts, toward the first hologram layer through diffraction, part of light in the first wavelength band transmitted through the first hologram layer and that transmits other part of the light in the first wavelength band transmitted through the first hologram layer.

9 Claims, 6 Drawing Sheets

OPTICAL ELEMENT AND VIRTUAL IMAGE DISPLAY DEVICE

The present application is based on, and claims priority from JP Application Serial Number 2021-124981, filed Jul. 30, 2021, the disclosure of which is hereby incorporated by reference herein in its entirety.

BACKGROUND

1. Technical Field

The present disclosure relates to an optical element that increases a luminous flux width of imaging light from an image formation device and a virtual image display device incorporating the optical element therein.

2. Related Art

As a virtual image display device or a video display apparatus of an eyeball projection type, there has been publicly known a technique in which color holograms of a reflection type are incorporated as a pupil expansion element and light emitted from a display device is guided to an eyeball (see FIG. 9 and the like in JP-A-8-184779). In this apparatus, the light from the display device is diffracted by the two color holograms of a reflection type that form the pupil expansion element. With this, an optical axis direction is bent twice, and then is emitted to an eyeball.

In the apparatus of JP-A-8-184779, the optical axis direction is bent twice, and the color holograms of a reflection type are arranged to be inclined at an angle of 45 degrees with respect to the optical axis. This leads to size increase of the pupil expansion element.

SUMMARY

According to one aspect of the present disclosure, an optical element includes a substrate, a first hologram element provided on one side of the substrate, and a second hologram element provided on another side of the substrate. The first hologram element includes a first hologram layer that diffracts part of incident light in a first wavelength band and that transmits another part of the incident light in the first wavelength band, and the second hologram element includes a second hologram layer that diffracts, toward the first hologram layer, part of the light in the first wavelength band, transmitted through the first hologram layer and that transmits another part of the light in the first wavelength band, transmitted through the first hologram layer.

DESCRIPTION OF EXEMPLARY EMBODIMENTS

First Exemplary Embodiment

Figure 1:
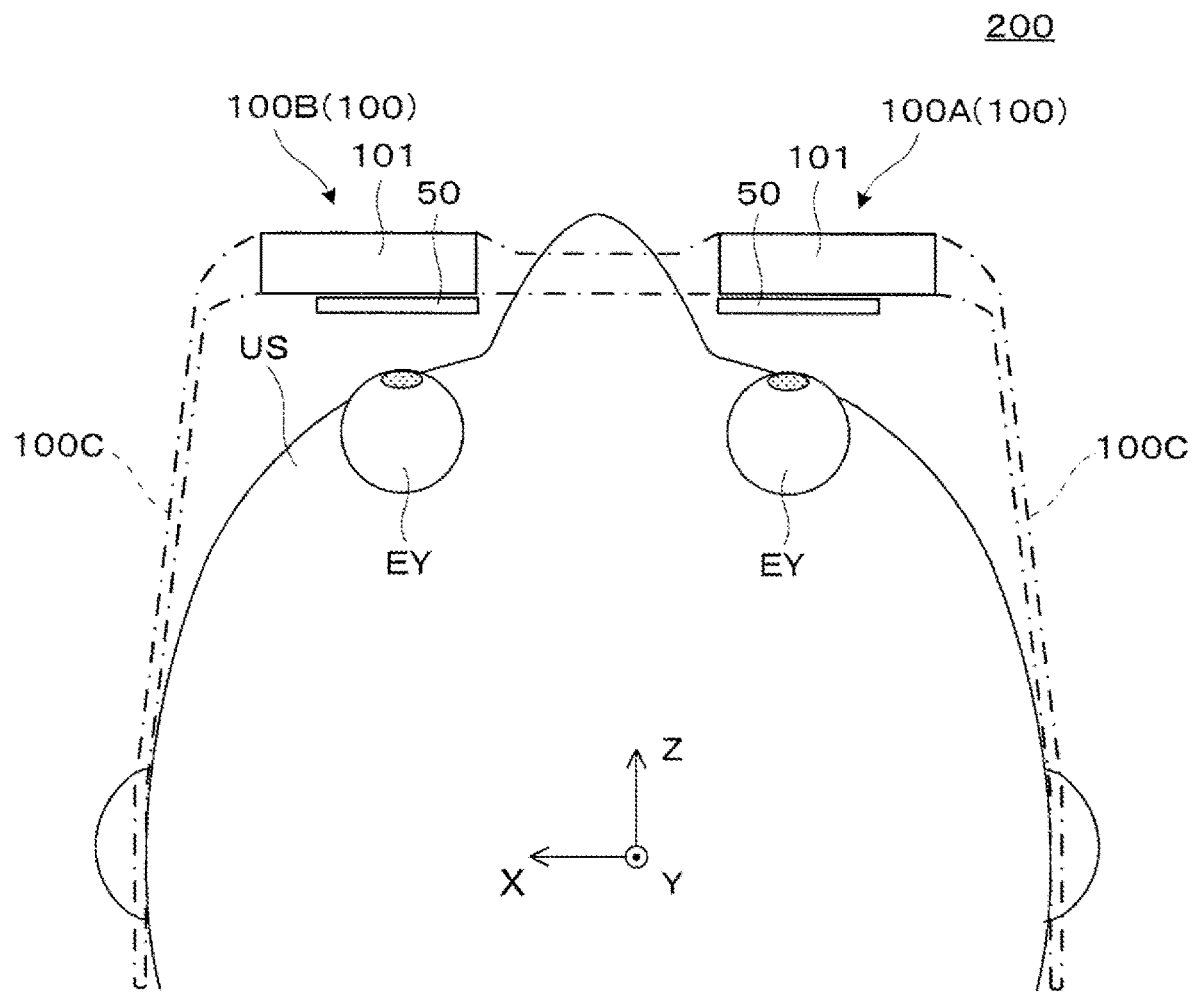
FIG. 1 is a plan view illustrating a mounted state of a virtual image display device according to a first exemplary embodiment.

With reference to FIG. 1, an optical element and a virtual image display device incorporating the optical element therein according to a first exemplary embodiment of the present disclosure are described below.

FIG. 1 is a diagram illustrating a mounted state of a head-mounted display (hereinafter, also referred to as "HMD") 200, and the HMD 200 allows an observer or wearer US who is wearing the HMD 200 to be able to recognize an image as a virtual image. In FIG. 1 and the like, X, Y, and Z are an orthogonal coordinate system, a +X direction corresponds to a transverse direction in which two eyes EY of the observer or wearer US who is wearing the HMD 200 or a virtual image display device 100 are arrayed, a +Y direction corresponds to an upward direction orthogonal to the transverse direction in which the two eyes EY of the wearer US are arrayed, and a +Z direction corresponds to a direction to the front or a forward direction for the wearer US. A ±Y direction is parallel to a vertical axis or a vertical direction.

The HMD 200 includes a first virtual image display device 100A for the right eye, a second virtual image display device 100B for the left eye, and a support device 100C that includes a pair of temples and supports the virtual image display devices 100A and 100B. The first virtual image display device 100A is arranged to cover the front side of the eye EY of the wearer US, that is, the +Z side. The first virtual image display device 100A includes an imaging light generation unit 101 and an optical element 50 for pupil expansion. The imaging light generation unit 101 is arranged on the external side away from the eye EY, and the optical element 50 is arranged on the eye EY side being the inner side. The first virtual image display device 100A and the second virtual image display device 100B are optically inverted left and right, in other words, inverted on a target surface parallel to a YZ plane. Thus, hereinafter, the first virtual image display device 100A for the right eye is described as a representative display device 100.

Figure 2:
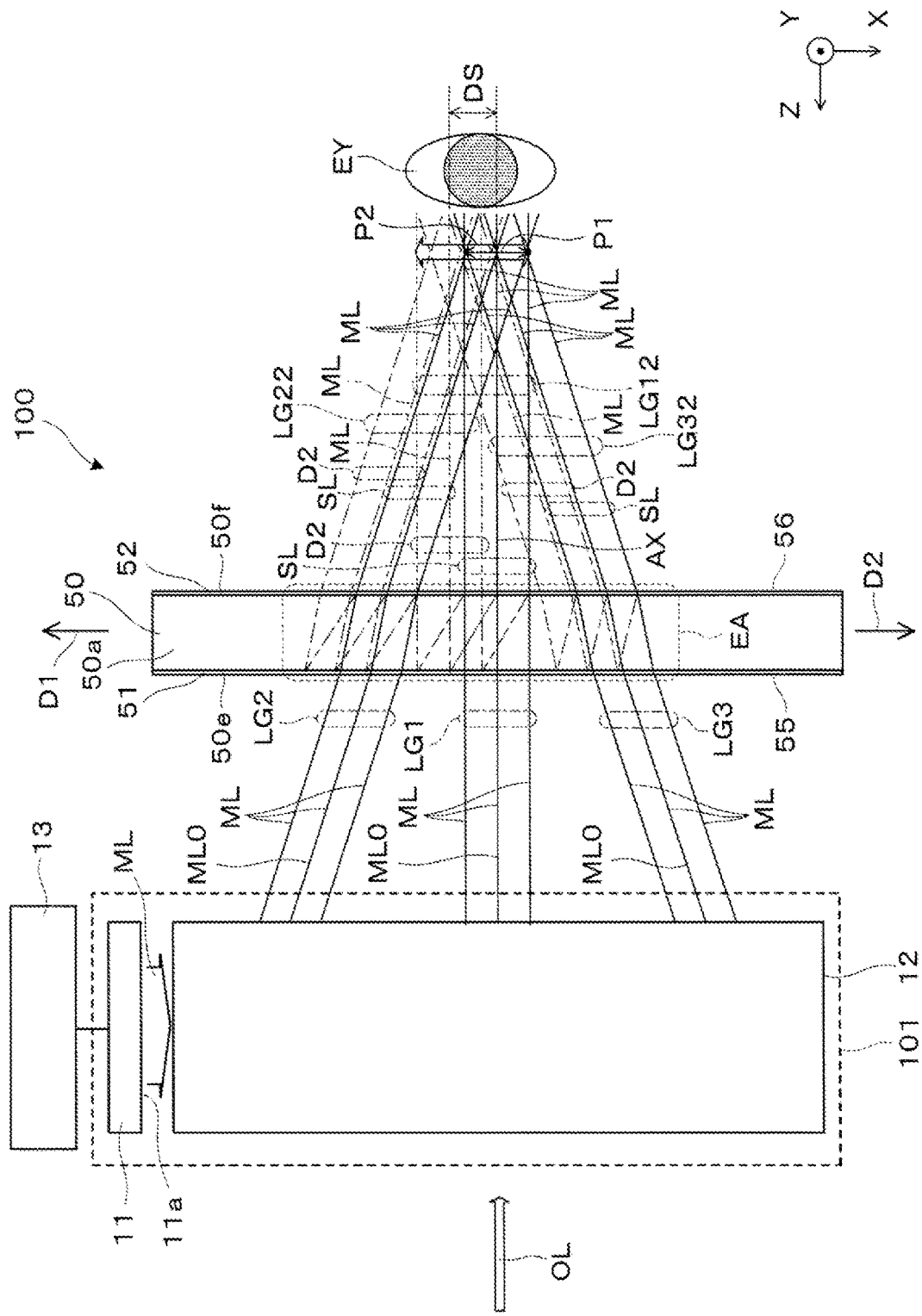
FIG. 2 is a plan view schematically illustrating a part of the virtual image display device according to the first exemplary embodiment.

FIG. 2 is a schematic plan view illustrating an optical configuration of the virtual image display device 100. The virtual image display device 100 includes the imaging light generation unit 101, the optical element 50, and a control device 13. The imaging light generation unit 101 and the optical element 50 are supported by the support device 100C illustrated in FIG. 1, and the control device 13 is incorporated in a case (not illustrated) of the support device 100C.

The imaging light generation unit 101 is an image light generation device or an image formation device that includes a display element 11 and an imaging optical system 12, and is also referred to as an image projection module. The imaging light generation unit 101 generates imaging light ML corresponding to light from a far virtual image, and emits the imaging light ML to the eye EY.

The display element 11 is, for example, an organic electroluminescence (EL) display, an inorganic EL display, or an array display of LEDs, and forms a still image or a moving image on a two-dimensional display surface. In the present exemplary embodiment, the display element 11 forms an image of a single color. In other words, the imaging light ML emitted from the imaging light generation unit 101 is, for example, green light, specifically, light in a first wavelength band containing a wavelength of approximately 540 nm. Even when the first wavelength band of the imaging light ML is a relatively broad band, an operation can be performed. However, in view of improvement of diffraction efficiency, the first wavelength band is preferably a narrow band.

The display element 11 is not limited to a spontaneous light emission type image light generation device, and may include an LCD and another light modulation element, and may form an image by illuminating the light modulation element with a light source such as a backlight. As the display element 11, a liquid crystal on silicon (LCOS) (LCoS is a registered trademark), a digital micro-mirror device, or the like may be used instead of an LCD. The imaging optical system 12 collimate the imaging light ML emitted from the display element 11, and the collimated imaging light ML enters the eye EY. At this stage, the imaging optical system 12 converges a main beam MLO of the imaging light ML, which is emitted from each point on a display surface 11a of the display element 11, to an initial position of an exit pupil P1. The imaging optical system 12 includes an optical member that enables a see-through view, and transmits external light OL. As described later in detail, the optical element 50 enlarges a luminous flux width of the imaging light ML, which is collimated by the imaging optical system 12, in a collimated state. The imaging light ML having an enlarged luminous flux width is converged to an enlarged position of an exit pupil P2. The control device 13 operates the display element 11, based on an image signal acquired from a communication unit omitted in illustration or an image signal generated inside, and causes the display surface 11a to display a picture such as a moving image or a still image.

Figure 3:
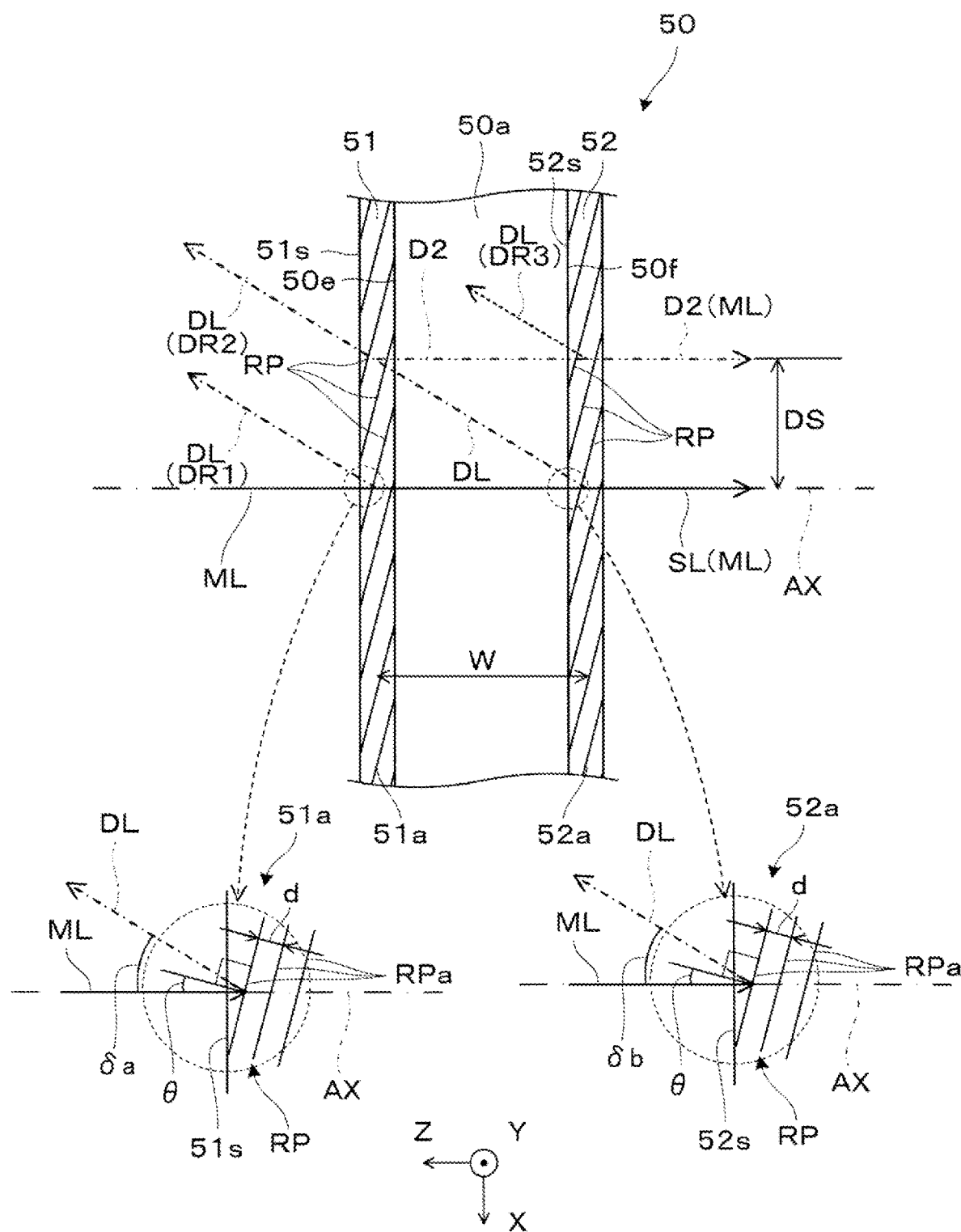
FIG. 3 is a plan cross-sectional view illustrating an optical element.

With reference to FIG. 3, a shape and a configuration of the optical element 50 are described. The optical element 50 is a member having a parallel flat plate shape, and includes a substrate 50a having light transmittance, a first hologram element 51 provided to one side of the substrate 50a, and a second hologram element 52 provided to the other side of the substrate 50a. The first hologram element 51 is bonded to a first surface 50e on the one side of the substrate 50a, and entirely covers the first surface 50e. The second hologram element 52 is bonded to a second surface 50f on the other side of the substrate 50a, and entirely covers the second surface 50f. The optical element 50 extends in parallel to an XY plane vertical to an optical axis AX, and the first hologram element 51 and the second hologram element 52 also extend in parallel to the XY plane vertical to the optical axis AX. The first hologram element 51 and the second hologram element 52 are arranged to cover an effective region EA through which the imaging light ML passes (see FIG. 2). In other words, the first hologram element 51 is provided to overlap with the second hologram element 52 in a front view corresponding to the −Z direction. As a result, a size of a region of the first hologram element 51 is equal to a size of a region of the second hologram element 52. Here, when a difference between the regions of the first hologram element 51 and the second hologram element 52 is from 2% to 3%, it is assumed that both the regions have an equal size.

The substrate 50a is a parallel flat plate having light transmittance in a visible wavelength range, and is formed of glass, for example. However, the substrate 50a is not limited thereto, and may be formed of an acrylic resin, polycarbonate, a polyolefin resin, or the like. In consideration of a weight and arrangement, it is assumed that the thickness of the substrate 50a is 10 mm or less. The thickness of the substrate 50a is relevant to an interval W between diffraction elements described later, and the larger thickness is more effective in enlarging a pupil size. However, it is assumed that, generally, the thickness is approximately from 5 mm to 6 mm.

The first hologram element 51 includes a sheet-like first hologram layer 51a that diffracts part of the incident imaging light ML in the first wavelength band and transmits other part of the incident imaging light ML in the first wavelength band. On one side of the first hologram layer 51a, in other words, an external side on which the imaging optical system 12 is arranged, an anti-reflection film 55 (FIG. 2) is formed. The second hologram element 52 includes a sheet-like second hologram layer 52a that diffracts, to the first hologram layer 51a, part of the imaging light ML in the first wavelength band passing through the first hologram layer 51a and transmits other part of the imaging light ML in the first wavelength band passing through the first hologram layer 51a. On the other side of the second hologram layer 52a, in other words, on an inner side on which the eye EY is arranged, an anti-reflection film 56 (FIG. 2) is formed. In the description given above, the first wavelength band being a wavelength range of the imaging light ML specifically corresponds to green light, and the first hologram layer 51a and the second hologram layer 52a function as diffraction elements of a reflection type in the first wavelength band.

The first hologram layer 51a is a diffraction element of a reflection type having a transmittance from 5% to 50%, and the second hologram layer 52a is also a diffraction element of a reflection type having a transmittance from 5% to 50%. The first hologram layer 51a and the second hologram layer 52a are volume holograms of a reflection type. With this, reflection diffraction efficiency with respect to a predetermined wavelength can be extremely higher. A transmittance of the first hologram layer 51a and the second hologram layer 52a can be adjusted by adjusting diffraction efficiency, specifically, reducing a thickness of an interference layer more than usually. In the interference layer, an interference fringe is formed. When a transmittance of the first hologram layer 51a and the second hologram layer 52a is equal to or greater than 5%, attenuation of straight light being zero-order light passing therethrough can be suppressed, and luminance of the imaging light ML can be secured. Further, when a transmittance of the first hologram layer 51a and the second hologram layer 52a is equal to or less than 50%, attenuation of parallel shift light generated by two diffractions, in other words, double diffraction light D2, which is described later in detail, is suppressed, and luminance of the imaging light ML according to pupil enlargement can be secured.

An interference fringe RP is formed inside the first hologram layer 51a. Here, the interference fringe RP corresponds to phase information recorded in the first hologram layer 51a, and appears as a periodic pattern or a physical state in the XZ cross-section. The periodic pattern may be a pattern of refractive index distribution. In the XZ cross-section, the interference fringe RP is inclined by an angle θ to the −X side with respect to the +Z direction in which the optical axis AX extends. More specifically, a normal line of a reference plane RPa forming the interference fringe RP is inclined by an inclination angle θ in a clockwise direction with respect to the optical axis AX. As a result, the imaging light ML that enters a surface 51s of the first hologram layer 51a at an incident angle i=0 degree is reflected and diffracted by the interference fringe RP in the first hologram layer 51a, and is emitted from the surface 51s of the first hologram layer 51a in a deflecting direction that is inclined by an angle δa with respect to the optical axis AX. The angle δa at which diffraction light DL is emitted corresponds to a value 2θ obtained by multiplying the inclination angle θ of the interference fringe RP by two. Strictly speaking, the angle δa is converted from the value 2θ, considering refraction due to a difference between an average refractive index of the first hologram layer 51a and a refractive index of air. In the interference fringe RP, an interval d between the reference planes RPa adjacent to each other is a periodic interval of the interference fringe RP, and is obtained by reflecting a wavelength and a deflecting direction of the diffraction light DL to be diffracted. Specifically, the interval d is obtained with the expression given below, where n is an average refractive index of the first hologram layer 51a and λ is a wavelength of the imaging light ML.

$$d=\lambda/(n\cdot 2\cos\theta)$$

Similarly, in the first hologram layer 51a, the interference fringe RP is formed inside the second hologram layer 52a. In the XZ cross-section, the interference fringe RP is inclined by the angle θ to the −X side with respect to the +Z direction in which the optical axis AX extends. More specifically, the normal line of the reference plane RPa forming the interference fringe RP is inclined by the inclination angle θ in the clockwise direction with respect to the optical axis AX. As a result, the imaging light ML that enters a surface 52s of the second hologram layer 52a at an incident angle i=0 degree is diffracted by the interference fringe RP in the second hologram layer 52a, and is emitted from the surface 52s of the second hologram layer 52a in a deflecting direction that is inclined by an angle δb with respect to the optical axis AX. The angle δb at which the diffraction light DL is emitted corresponds to a value 2θ obtained by multiplying the inclination angle θ of the interference fringe RP by two. Strictly speaking, the angle δb is converted from the value 2θ, considering refraction due to a difference between an average refractive index of the second hologram layer 52a and a refractive index of the substrate 50a. In the interference fringe RP, the interval d between the reference planes RPa adjacent to each other is a periodic interval of the interference fringe RP, and is obtained by reflecting a wavelength and a deflecting direction of the diffraction light DL to be diffracted. The inclination angle θ of the interference fringe RP formed in the second hologram layer 52a is equal to the inclination angle θ of the interference fringe RP formed in the first hologram layer 51a. Further, the interval d being a periodic pattern of the interference fringe RP formed in the second hologram layer 52a is equal to the interval d being the interference fringe RP formed in the first hologram layer 51a. This indicates that the interference fringe RP formed in the first hologram layer 51a and the interference fringe RP formed in the second hologram layer 52a are identical to each other, and also indicates that the inclination direction of the interference fringe RP in the first hologram layer 51a and the inclination direction of the interference fringe RP in the second hologram layer 52a are in the −X direction with the optical axis AX as a reference and are identical to each other.

For example, the first hologram layer 51a and the second hologram layer 52a are formed of a photopolymer. A resin substrate to which a photopolymer sheet is bonded is subjected to two-light flux interference light exposure with a laser. Specifically, one side of the photopolymer sheet is irradiated with reference light being a green plane wave at a predetermined angle while the other side thereof is irradiated with object light being a green plane light. With this, the interference fringe RP can be recorded as refractive index distribution on the photopolymer sheet. The first hologram layer 51a and the second hologram layer 52a thus obtained are bonded and fixed to the substrate 50a. For convenience of description, FIG. 3 only illustrates the photopolymer sheet on which the interference fringes RP are formed in the first hologram layer 51a and the second hologram layer 52a. However, a transparent resin substrate has one surface on which the photopolymer sheet having the interference fringes RP formed therein is formed, and is bonded and fixed to the substrate 50a as the first hologram layer 51a or the like. Only the photopolymer sheet is illustrated below as a hologram layer for convenience of description. However, the hologram layer that is produced in actuality includes the transparent resin substrate that supports the photopolymer sheet as described above. Note that the first hologram layer 51a and the second hologram layer 52a have similar configurations, and hence can be produced collectively by two-light flux interference light exposure at one time.

In the optical element 50, the first hologram element 51 or the first hologram layer 51a partially transmits the incident imaging light ML, and the second hologram element 52 or the second hologram layer 52a also partially transmits the incident imaging light ML. In other words, the imaging light ML entering the optical element 50 advances through the first hologram element 51 at a predetermined transmittance, and advances through the second hologram element 52 at a predetermined transmittance. Straight light SL being transmitted light that passes through the first hologram element 51 and the second hologram element 52 is emitted from a position obtained by extending the original optical path of the imaging light ML, and propagates in parallel to the optical axis AX.

The second hologram element 52 or the second hologram layer 52a partially diffracts the incident imaging light ML to the first hologram element 51 or the first hologram layer 51a, and the first hologram element 51 or the first hologram layer 51a diffracts the diffraction light DL, which is diffracted and returned from the second hologram layer 52a, to the second hologram layer 52a again. The double diffraction light D2, which advances in a zig-zag manner due to diffraction by the second hologram layer 52a and diffraction by the first hologram layer 51a, propagates in parallel to the optical axis AX, and is emitted, via the second hologram element 52, in a shifted state in parallel to the same direction as the straight light SL passing through the first hologram element 51 and the second hologram element 52. In the description given above, reflection light DR1, reflection DR2, and reflection light DR3 are components that are not used for image display. The reflection light DR1 is the diffraction light DL formed by the imaging light ML that firstly enters the first hologram element 51. The reflection light DR2 is the diffraction light DL formed by the imaging light ML that firstly enters the second hologram element 52, and passes through the first hologram element 51. The reflection light DR3 is formed when the second hologram element 52 further diffracts the double diffraction light D2 that advances in a zig-zag manner due to diffraction by the second hologram element 52 and the first hologram element 51. In this manner, together with the straight light SL, the double diffraction light D2 is emitted in the −Z direction, that is, to the eye EY side (see FIG. 2) in a state of being shifted to the −X direction by a shift amount DS with the straight light SL as a reference. Here, the shift amount DS is expressed as $$DS=W\cdot\tan\delta b$$

where W is an interval between the first hologram element 51 and the second hologram element 52 in the Z direction.

With reference to FIG. 2, a central light beam group LG1 in parallel with the optical axis AX of the imaging optical system 12 is examined. The central light beam group LG1 enters the optical element 50, sequentially passes through the first hologram element 51 and the second hologram element 52, and enters the position of the exit pupil P1 as the straight light SL. Further, the light beam group LG1 enters the optical element 50, passes through the first hologram element 51, is reflected due to diffraction by the second hologram element 52 so as to be inclined and retrograde, propagates in parallel to the optical axis AX due to diffraction by the first hologram element 51, and enters, as the double diffraction light D2, a position on the −X side by the shift amount DS with respect to the position of the exit pupil P1. The straight light SL and the double diffraction light D2 enlarge the width of the imaging light ML in the X direction, and the imaging light ML being light beam group LG12, which is obtained by combining the straight light SL being original light and double diffraction light D2 being duplicate light with each other, enters the enlarged exit pupil P2. In other words, the exit pupil in the optical system is successfully enlarged in the X direction being a transverse direction.

Although detailed description is omitted, with regard to a light beam group LG2 from a right oblique direction at a predetermined inclination angle with respect to the optical axis AX of the imaging optical system 12 (in other words, from the −X and +Z directions), the width of the imaging light ML in the X direction is also enlarged by the straight light SL being original light obtained by partially transmitting the original imaging light ML and the double diffraction light D2 being duplicate light at an inclination angle equal to the original imaging light ML. The imaging light ML being a light beam group LG22 obtained by combining the straight light SL and the double diffraction light D2 with each other enters the position of the enlarged exit pupil P2. In other words, for the right oblique light, emission in the optical system is successfully enlarged in the X direction being a transverse direction.

Although detailed description is omitted, with regard to a light beam group LG3 from a left oblique direction at a predetermined inclination angle with respect to the optical axis AX of the imaging optical system 12 (in other words, from the +X and +Z directions), the width of the imaging light ML in the X direction is also enlarged by the straight light SL being original light obtained by partially transmitting the original imaging light ML and the double diffraction light D2 being duplicate light at an inclination angle equal to the original imaging light ML. The imaging light ML being a light beam group LG32 obtained by combining the straight light SL and the double diffraction light D2 with each other enters the position of the enlarged exit pupil P2. In other words, for the left oblique light, emission in the optical system is successfully enlarged in the X direction being a transverse direction.

Figure 4:
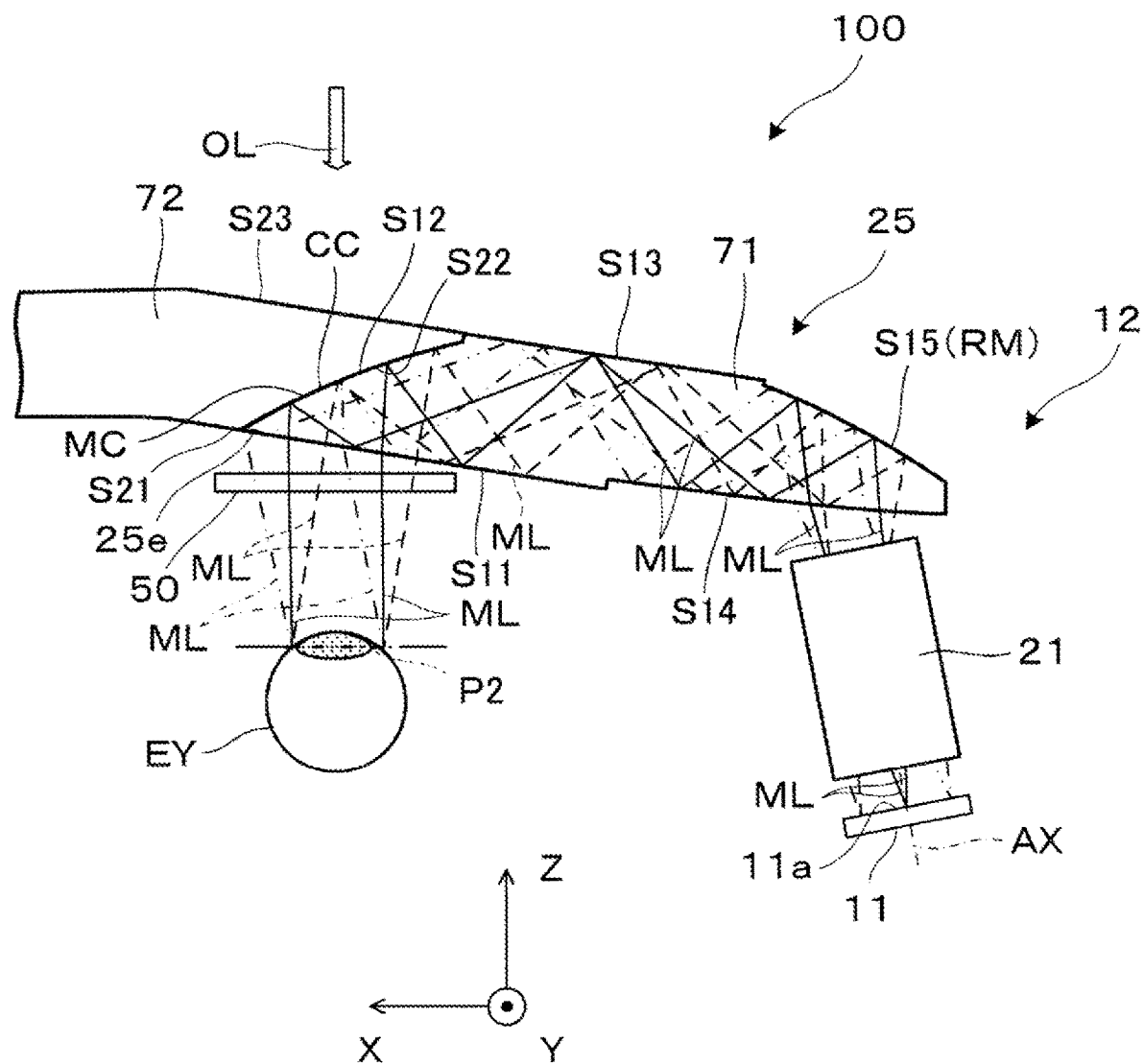
FIG. 4 is a plan view illustrating a specific example of an imaging optical system.

FIG. 4 is a plan view illustrating a specific example of the imaging optical system 12. The imaging optical system 12 includes a projection lens 21 and a light guide body 25. The light guide body 25 is formed by joining a light guide member 71 and a light transmission member 72 via an adhesive layer CC. The light guide member 71 and the light transmission member 72 are formed of a resin material that exhibits high light transmittance in a visible region. The light guide member 71 has first to fifth surfaces S11 to S15 of which the first and third surfaces S11 and S13 are flat surfaces parallel to each other and the second, fourth, and fifth surfaces S12, S14, and S15 are convex optical surfaces as a whole and are constituted of freely curved surfaces, for example. The light transmission member 72 has first to third transmission surfaces S21 to S23 of which the first and third transmission surfaces S21 and S23 are flat surfaces parallel to each other, and the second transmission surface S22 is a concave optical surface as a whole and is constituted of a freely curved surface, for example. The second surface S12 of the light guide member 71 and the second transmission surface S22 of the light transmission member 72 have an equal shape in which a recess and a protrusion are inverted, and a partial reflection surface MC is formed at a surface of one of them.

The optical element 50 for pupil expansion is arranged to face the first surface S11 being a light emission surface 25e of the light guide body 25 and the first transmission surface S21.

An overview of the optical path of the imaging light ML is described below. The light guide member 71 guides the imaging light ML emitted from the projection lens 21 toward the eye of an observer due to reflection at the first to fifth surfaces S11 to S15 or the like. Specifically, the imaging light ML from the projection lens 21 first enters the fourth surface S14, is reflected by the fifth surface S15 which is an inner surface of the reflection film RM, and again enters the fourth surface S14 from the inside and totally reflected, enters the third surface S13 and totally reflected, and enters the first surface S11 and totally reflected. The imaging light ML totally reflected by the first surface S11 enters the second surface S12, and is partially reflected while partially transmitted through a partial reflection surface MC provided on the second surface S12, and again enters the first surface S11 and passes therethrough. The luminous flux width of the imaging light ML passing through the first surface S11 is enlarged by the optical element 50, and the imaging light ML enters, as a substantially parallel luminous flux, the position of the enlarged exit pupil P2 at which the eyes EY of the observer is arranged. That is, the observer observes an image with the imaging light ML as a virtual image.

The light guide body 25 allows the observer to visually recognize the imaging light ML by the light guide member 71, and allows the observer to observe an external image with little distortion in a state in which the light guide member 71 and the light transmission member 72 are combined with each other. At this time, because the third surface S13 and the first surface S11 are flat surfaces substantially parallel to each other (diopter is approximately 0), little aberration and the like is generated for outside light OL. Furthermore, because the third transmission surface S23 and the first transmission surface S21 are flat surfaces substantially parallel to the first surface S11, little aberration or the like is generated.

In the description given above, the optical element 50 generates the diffraction light DL with respect to the green imaging light ML. The optical element 50 may generate the diffraction light DL at predetermined diffraction angle with respect to blue or red imaging light ML. However, when the optical element 50 is for a blue color, for example, the display element 11 is required to be a device for emitting the blue imaging light ML.

In the optical element 50 according to the exemplary embodiment given above, the second hologram layer 52a partially diffracts, to the first hologram element 51, the light in the first wavelength band passing through the first hologram element 51, that is, the green imaging light ML, and the first hologram layer 51a diffracts the green imaging light ML, which is diffracted by the second hologram layer 52a, to the second hologram layer 52a again. Thus, the double diffraction light D2 being light diffracted twice can be emitted, via the second hologram element 52, in a shifted state in parallel to the same direction as the straight light SL passing through the first hologram element 51 and the second hologram element 52. With this, the luminous flux width of the imaging light ML can be enlarged, and the pupil of the imaging light generation unit 101 that emits the imaging light ML can be enlarged.

Second Exemplary Embodiment

Figure 5:
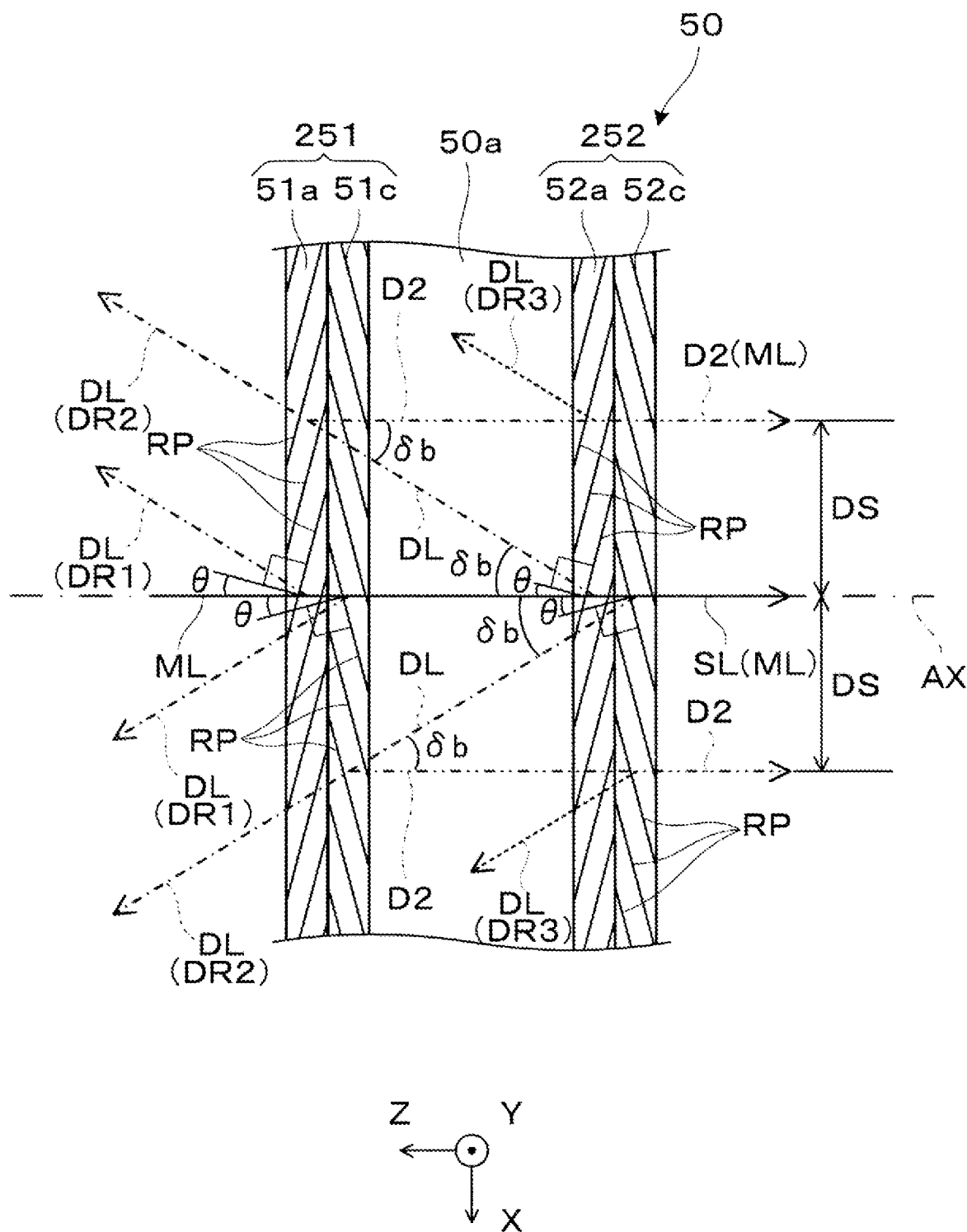
FIG. 5 is a plan cross-sectional view illustrating an optical element according to a second exemplary embodiment.

With reference to FIG. 5, an optical element and the like according to a second exemplary embodiment are described below. The optical element according to the second exemplary embodiment is obtained by modifying a part of the optical element according to the first exemplary embodiment and increasing branch optical paths due to diffraction, description for the commonly shared parts is omitted.

The optical element 50 includes the substrate 50a, a first hologram element 251 provided to one side of the substrate 50a, that is, on the external side, and a second hologram element 252 provided to the other side of the substrate 50a, that is, the inner side on which the eye EY is present. The first hologram element 251 includes the first hologram layer 51a having a sheet-like shape and a third hologram layer 51c having a sheet-like shape that is different from the sheet-like shape of the first hologram layer 51a, and the second hologram element 252 includes the second hologram layer 52a having a sheet-like shape and a fourth hologram layer 52c having a sheet-like shape that is different from the sheet-like shape of the second hologram layer 52a. In the first hologram element 251, the third hologram layer 51c is arranged between the first hologram layer 51a and the substrate 50a, and is bonded thereto. In the second hologram element 252, the second hologram layer 52a is arranged between the fourth hologram layer 52c and the substrate 50a, and is bonded thereto.

Here, the first hologram layer 51a and the second hologram layer 52a form a pair, and function similarly in the first exemplary embodiment. Further, the third hologram layer 51c and the fourth hologram layer 52c form a pair, and function similarly to the first hologram layer 51a and the second hologram layer 52a, but the diffraction direction thereof is inverted right and left with respect to the ±X direction being a transverse direction from the first hologram layer 51a and the second hologram layer 52a. Specifically, the third hologram layer 51c reflects and diffracts part of the incident imaging light ML in a direction between the +X direction and the +Z direction, and transmits and causes part of the incident imaging light ML to advance. The fourth hologram layer 52c reflects and diffracts part of the imaging light ML, which passes through the third hologram layer 51c, in the direction between the +X direction and the +Z direction, and transmits and causes part of the imaging light ML, which passes through the third hologram layer 51c, to advance. Thus, the inclination direction of the interference fringe RP in the first hologram layer 51a is mirror symmetric with the inclination direction of the interference fringe RP in the adjacent third hologram layer 51c across the XY plane. The inclination direction of the interference fringe RP in the second hologram layer 52a is mirror symmetric with the inclination direction of the interference fringe RP in the fourth hologram layer 52c across the XY plane. In other words, in the XZ cross-section, the interference fringe RP in the third hologram layer 51c is inclined at the angle θ to the +X side with respect to the +Z direction in which the optical axis AX extends. Further, a periodic interval of the interference fringes RP in the third hologram layer 51c is equal to a periodic interval of the interference fringes RP in the first hologram layer 51a adjacent thereto on the external side. In the XZ cross-section, the interference fringe RP in the fourth hologram layer 52c is inclined at the angle θ to the +X side with respect to the +Z direction in which the optical axis AX extends. Further, a periodic interval of the interference fringes RP in the fourth hologram layer 52c is equal to a periodic interval of the interference fringes RP in the second hologram layer 52a adjacent thereto on the external side.

Note that the diffraction light DL diffracted by the third hologram layer 51c and the fourth hologram layer 52c has low diffraction efficiency with respect to the interference fringe RP in the inclination direction recorded in the first hologram layer 51a and the second hologram layer 52a. In contrast, the diffraction light DL diffracted by the first hologram layer 51a and the second hologram layer 52a has bight diffraction efficiency with respect to the interference fringe RP in the inclination direction recorded in the third hologram layer 51c and the fourth hologram layer 52c. Therefore, diffraction by the third hologram layer 51c and the fourth hologram layer 52c and diffraction by the first hologram layer 51a and the second hologram layer 52a may be substantially independent from each other.

With regard to the optical path, the second hologram layer 52a partially diffracts the incident imaging light ML to the first hologram layer 51a, and thus inclines and propagates the imaging light ML in the first direction (the −X direction). More specifically, the second hologram layer 52a diffracts the incident imaging light ML, and thus emits the imaging light ML in the inclination direction rotated in the clockwise direction by the angle δb with respect to the +Z direction parallel to the optical axis AX. The first hologram layer 51a diffracts the diffraction light DL, which is returned after diffraction by the second hologram layer 52a, to the second hologram layer 52a again, and emits the diffraction light DL in the original direction parallel to the optical axis AX. As a result, together with the straight light SL, the double diffraction light D2 is emitted in the −Z direction, that is, to the eye EY side (see FIG. 2) in a state of being shifted to the −X direction by a shift amount DS with the straight light SL as a reference.

The fourth hologram layer 52c partially diffracts the incident imaging light ML to the third hologram layer 51c, and thus inclines and propagates the imaging light ML in the second direction (the +X direction). More specifically, the fourth hologram layer 52c diffracts the incident imaging light ML, and emits the imaging light ML in the inclination direction rotated in the anti-clockwise direction by the angle δb with respect to the +Z direction parallel to the optical axis AX. The third hologram layer 51c diffracts the diffraction light DL, which is returned after diffraction by the fourth hologram layer 52c, to the fourth hologram layer 52c again, and emits the imaging light ML in the direction parallel to the optical axis AX. The double diffraction light D2, which advances in a zig-zag manner due to diffraction by the fourth hologram layer 52c and diffraction by the third hologram layer 51c, propagates in parallel to the optical axis AX, and is emitted, via the second hologram element 52, in a shifted state in parallel to the same direction as the straight light SL passing through the first hologram element 51 and the second hologram element 52. In this manner, together with the straight light SL, the double diffraction light D2 is emitted in the −Z direction, that is, to the eye EY side (see FIG. 2) in a state of being shifted to the +X direction by a shift amount DS with the straight light SL as a reference. Here, the shift amount DS of the double diffraction light D2 due to the fourth hologram layer 52c and the third hologram layer 51c is equal to the shift amount DS of the double diffraction light D2 due to the second hologram layer 52a and the first hologram layer 51a. In other words, in the optical element 50 according to the present exemplary embodiment, the pupil size is symmetrically enlarged with respect to the ±X direction being a transverse direction by an amount as twice as large as the first exemplary embodiment, that is, an amount corresponding to a value 2 DS.

In the first hologram element 251, the order of the first hologram layer 51a and the third hologram layer 51c may be reversed, and the third hologram layer 51c may be arranged on the external side of the first hologram layer 51a. In this case, the shift amount is slightly different between right and left, but a similar effect of enlarging pupil can also be obtained. Further, in the second hologram element 252, the order of the second hologram layer 52a and the fourth hologram layer 52c may be reversed, and the fourth hologram layer 52c may be arranged on the external side (the substrate 50a side) of the second hologram layer 52a.

In the optical element 50 according to the exemplary embodiment given above, the fourth hologram layer 52c partially diffracts the light in the first wavelength band passing through the first hologram element 251, that is, the green imaging light ML to the third hologram layer 51c, and the third hologram layer 51c diffracts the green imaging light ML, which is diffracted by the fourth hologram layer 52c, to the fourth hologram layer 52c again. Thus, the obtained double diffraction light D2 can be emitted, via the second hologram element 52, in a shifted state in parallel to the same direction as the straight light SL passing through the first hologram element 51 and the second hologram element 52. At this state, the inclination direction of propagation of the diffraction light DL due to the second hologram layer 52a and the inclination direction of propagation of the diffraction light DL due to the fourth hologram layer 52c are opposite to each other. The diffraction light DL or the double diffraction light D2 from the second hologram layer 52a and the diffraction light DL or the double diffraction light D2 from the fourth hologram layer 52c are shifted in parallel in the directions opposite to each other. With this, the luminous flux width of the imaging light ML can be enlarged in a symmetric manner.

Third Exemplary Embodiment

Figure 6:
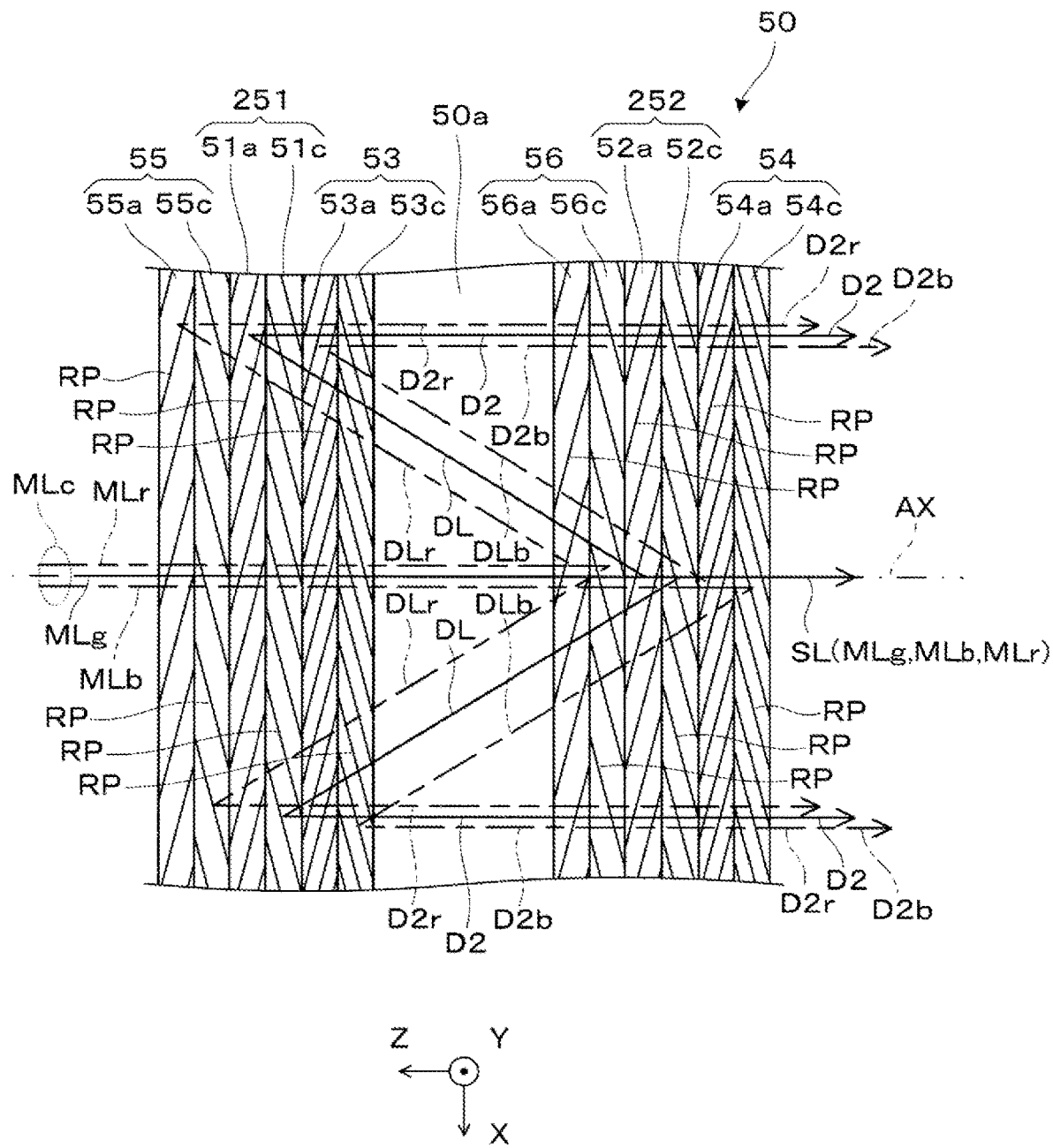
FIG. 6 is a plan cross-sectional view illustrating an optical element according to a third exemplary embodiment.

With reference to FIG. 6, an optical element and the like according to a third exemplary embodiment are described below. The optical element according to the third exemplary embodiment is obtained by modifying a part of the optical element according to the first exemplary embodiment for achieving color display, description for the commonly shared parts is omitted.

Instead of light of a single green color, colored imaging light MLc enters the optical element 50. The imaging light MLc contains a green component MLg in the first wavelength band, a blue component MLb in a second wavelength band, and a red component MLr in a third wavelength band. Here, the second wavelength band specifically includes a wavelength of approximately 470 nm, and the third wavelength band specifically includes a wavelength of approximately 630 nm.

The optical element 50 includes the first hologram element 251, a third hologram element 53, and a fifth hologram element 55 on the external side being one side of the substrate 50a, and includes the second hologram element 252, a fourth hologram element 54, and a sixth hologram element 56 on the inner side being the other side of the substrate 50a. The first hologram element 251 and the second hologram element 252 are similar to the elements forming a pair in the second exemplary embodiment, and enlarge the pupil size for the green component MLg being green imaging light. The third hologram element 53 and the fourth hologram element 54 enlarge the pupil size for the blue component MLb having a wavelength shorter than the green component MLg. The fifth hologram element 55 and the sixth hologram element 56 enlarge the pupil size for the red component MLr having a wavelength longer than the green component MLg.

The third hologram element 53 includes a fifth hologram layer 53a and a seventh hologram layer 53c, and the fourth hologram element 54 includes a sixth hologram layer 54a and an eighth hologram layer 54c. The fifth hologram element 55 includes a ninth hologram layer 55a and an eleventh hologram layer 55c, and the sixth hologram element 56 includes a tenth hologram layer 56a and a twelfth hologram layer 56c.

The interference fringes RP having high diffraction efficiency for the blue component MLb in a blue wavelength are formed in the fifth hologram layer 53a and the seventh hologram layer 53c that form the third hologram element 53, and the blue component MLb is diffracted in the direction similarly to the green component MLg in the first hologram element 251. The interference fringes RP having high diffraction efficiency for the blue component MLb in a blue wavelength are formed in the sixth hologram layer 54a and the eighth hologram layer 54c that form the fourth hologram element 54, and the blue component MLb is diffracted in the direction similarly to the green component MLg in the second hologram element 252. The interference fringes RP having high diffraction efficiency for the red component MLr in a red wavelength are formed in the ninth hologram layer 55a and the eleventh hologram layer 55c that form the fifth hologram element 55, and the red component MLr is diffracted in the direction similarly to the green component MLg in the first hologram element 251. The interference fringes RP having high diffraction efficiency for the red component MLr in a red wavelength are formed in the tenth hologram layer 56a and the twelfth hologram layer 56c that form the sixth hologram element 56, and the red component MLr is diffracted in the direction similarly to the green component MLg in the second hologram element 252.

With regard to the blue color, the sixth hologram layer 54a partially reflects the incident blue component MLb by diffraction, and thus emits the blue component MLb in an inclination direction rotated in the clockwise direction by the angle δb with respect to the +Z direction parallel to the optical axis AX. The fifth hologram layer 53a diffracts diffraction light DLb, which is returned after diffraction by the sixth hologram layer 54a, to the sixth hologram layer 54a again, and thus emits the diffraction light DLb in the −Z direction that cancels the inclination at the angle δb. Double diffraction light D2b via the sixth hologram layer 54a and the fifth hologram layer 53a is emitted in the same direction as the straight light SL from the optical element 50 to the inside on which the eye EY is arranged, in a shifted state in the −X direction in parallel to the straight light SL.

With regard to the blue color, the eighth hologram layer 54c partially reflects the incident blue component MLb by diffraction, and thus emits the blue component MLb in an inclination direction rotated in the anti-clockwise direction by the angle δb with respect to the +Z direction parallel to the optical axis AX. The seventh hologram layer 53c diffracts the diffraction light DLb, which is returned after diffraction by the eighth hologram layer 54c, to the eighth hologram layer 54c again, and thus emits the diffraction light DLb in the −Z direction that cancels the inclination at the angle δb. The double diffraction light D2b via the eighth hologram layer 54c and the seventh hologram layer 53c is emitted in the same direction as the straight light SL from the optical element 50 to the inside on which the eye EY is arranged, in a shifted state in the +X direction in parallel to the straight light SL.

In this manner, for the blue component MLb, the straight light SL and the pair of double diffraction light D2 are synthesized to enlarge the pupil size in the ±X direction being a transverse direction.

With regard to the red color, the tenth hologram layer 56a partially reflects the incident red component MLr by diffraction, and thus emits the red component MLr in an inclination direction rotated in the clockwise direction by the angle δb with respect to the +Z direction parallel to the optical axis AX. The ninth hologram layer 55a diffracts diffraction light DLr, which is returned after diffraction by the tenth hologram layer 56a, to the tenth hologram layer 56a again, and thus emits the diffraction light DLr in the −Z direction that cancels the inclination at the angle δb. Double diffraction light D2r via the tenth hologram layer 56a and the ninth hologram layer 55a is emitted in the same direction as the straight light SL from the optical element 50 to the inside on which the eye EY is arranged, in a shifted state in the −X direction in parallel to the straight light SL.

With regard to the red color, the twelfth hologram layer 56c partially reflects the incident red component MLr by diffraction, and thus emits the red component MLr in an inclination direction rotated in the anti-clockwise direction by the angle δb with respect to the +Z direction parallel to the optical axis AX. The eleventh hologram layer 55c diffracts the diffraction light DLr, which is returned after diffraction by the twelfth hologram layer 56c, to the twelfth hologram layer 56c again, and thus emits the diffraction light DLr in the −Z direction that cancels the inclination at the angle δb. The double diffraction light D2r via the twelfth hologram layer 56c and the eleventh hologram layer 55c is emitted in the same direction as the straight light SL from the optical element 50 to the inside on which the eye EY is arranged, in a shifted state in the +X direction in parallel to the straight light SL.

In this manner, for the red component MLr, the straight light SL and the pair of double diffraction light D2 are synthesized to enlarge the pupil size in the ±X direction being a transverse direction.

The optical element 50 illustrated in FIG. 6 may be incorporated in the virtual image display device 100 illustrated in FIG. 2. In this case, the display element 11 forming the imaging light generation unit 101 displays a color moving image or still image.

In the exemplary embodiment given above, the order of the first hologram element 251, the third hologram element 53, and the fifth hologram element 55 on the external side may be changed, and the order of the second hologram element 252, the fourth hologram element 54, and the sixth hologram element 56 on the inner side may also be changed. However, the order is preferably changed so that the interval between the first hologram element 251 and the second hologram element 252, the interval between the third hologram element 53 and the fourth hologram element 54, and the interval between the fifth hologram element 55 and the sixth hologram element 56 match with one another. With this, the pupil size can be enlarged at the same extent for the respective colors.

In the optical element 50 according to the exemplary embodiment given above, a luminous flux width can be enlarged for the green component MLg in the first wavelength band, the blue component MLb in the second wavelength band, and the red component MLr in the third wavelength band, and hence the pupil can be enlarged for the colored imaging light MLc. Particularly, the first hologram element 251, the second hologram element 252, the third hologram element 53, the fourth hologram element 54, the fifth hologram element 55, and the sixth hologram element 56 are diffraction elements of a reflection type, and hence crosstalk of the colors is less likely to occur. When those diffraction elements of a reflection type are arranged along the optical axis AX, size reduction can easily be achieved.

Modified Examples and Others

The present disclosure is described according to the above-described exemplary embodiments, but the present disclosure is not limited to the above-described exemplary embodiments. The present disclosure may be carried out in various modes without departing from the gist of the present disclosure, and, for example, the following modifications may be carried out.

The imaging optical system 12 incorporated in the virtual image display device 100 is not limited to the example in FIG. 4, and may have various configurations. For example, in the example illustrated in FIG. 4, the imaging optical system 12 is an off-axis optical system of a horizontal type having asymmetry in the X direction or the transverse direction, but may be an off-axis optical system having asymmetry in the Y direction or the vertical direction. The elements illustrated in FIG. 4 are merely examples of the optical elements that form the imaging optical system 12, and the light guide member 71 and the light transmission member 72 may be replaced with a mirror and the like.

A vision correction lens may be removably arranged on the eye EY side of the optical element 50. The vision correction lens may be fixed to the optical element 50, or may be fixed to a support body of the optical element 50 or the imaging optical system 12.

The imaging optical system 12 may be a non-see-through type optical system that does not transmit the external light OL. In this case, the virtual image display device 100 is a virtual image display device of a closed type.

In the description above, the virtual image display device 100 is assumed to be mounted and used on a head, but the virtual image display device 100 described above may also be used as a hand-held display that is not mounted on a head and is viewed into it like a pair of binoculars.

An optical element in a specific mode includes a substrate, a first hologram element being provided to one side of the substrate, and a second hologram element being provided to another side of the substrate so as to sandwich the substrate with the first hologram element. The first hologram element includes a first hologram layer that diffracts part of incident light in a first wavelength band and transmits other part of the incident light in the first wavelength band. The second hologram element includes a second hologram layer that diffracts, to the first hologram element, part of light in the first wavelength band passing through the first hologram layer and transmits other part of the light in the first wavelength band passing through the first hologram layer.

In the optical element described above, the second hologram layer partially diffracts the light in the first wavelength band passing through the first hologram element, and the first hologram layer diffracts the light in the first wavelength band, which is diffracted by the second hologram layer, to the second hologram element again. With this, the light diffracted twice can be emitted, via the second hologram element, in a shifted state in parallel to the same direction as the light passing through the first hologram element and the second hologram element. With this, the luminous flux width of the imaging light can be enlarged, and the pupil of the imaging light generation unit that emits the imaging light can be enlarged.

In the specific mode, the first hologram element has a transmittance from 5% to 50%, and the second hologram element has a transmittance from 5% to 50%. When the transmittance is 5% or greater, attenuation of straight light can be suppressed, and luminance of the imaging light can be secured. Further, when the transmittance is 50% or less, attenuation of the light diffracted twice can be suppressed, and luminance of the imaging light according to pupil enlargement can be secured.

In the specific mode, a size of a region in which the first hologram element is provided is equal to a size of a region in which the second hologram element is provided. In this case, the light emitted from the first hologram element can be taken into the second hologram element, and loss of the light can be reduced.

In the specific mode, the first hologram layer has an interference fringe, the second hologram layer has an interference fringe, and an inclination direction of the interference fringe in the first hologram layer is similar to an inclination direction of the interference fringe in the second hologram layer. The inclination direction of the interference fringe in the hologram layer corresponds to the angle at which the reflected light is deflected due to diffraction.

In the specific mode, a periodic interval of the interference fringe in the first hologram layer is identical to a periodic interval of the interference fringe in the second hologram layer. The periodic interval of the interference fringes in both the hologram layers reflects a wavelength and a deflecting direction of the reflected light due to diffraction.

In the specific mode, the first hologram element includes a third hologram layer being different from the first hologram layer, the second hologram element includes a fourth hologram layer being different from the second hologram layer, the third hologram layer diffracts part of incident light in the first wavelength band and transmits other part of the incident light in the first wavelength band, the fourth hologram layer diffracts, to the third hologram layer, part of light in the first wavelength band passing through the third hologram layer and transmits other part of the light in the first wavelength band passing through the third hologram layer, the second hologram layer diffracts the part of the light in the first wavelength band passing through the first hologram layer, and thus propagate the light in the first wavelength band in an inclined state in a first direction, and the fourth hologram layer diffracts the part of the light in the first wavelength band passing through the third hologram layer, and thus propagates the light in the first wavelength band in an inclined state in a second direction being opposite to the first direction. In this case, the fourth hologram layer partially diffracts the light in the first wavelength band passing through the first hologram element, and the third hologram layer diffracts the light in the first wavelength band, which is diffracted by the fourth hologram layer, again. Thus, the light diffracted twice can be emitted, via the second hologram element, in a shifted state in parallel to the same direction as the light passing through the first hologram element and the second hologram element. At this state, the inclination direction of propagation of the light diffracted by the second hologram layer and the inclination direction of propagation of the light diffracted by the fourth hologram layer are opposite to each other. The diffraction light from the second hologram layer and the diffraction light from the fourth hologram layer are shifted in parallel in the directions opposite to each other. With this, the luminous flux width of the imaging light can be enlarged in a symmetric manner.

In the specific mode, the third hologram layer is provided between the first hologram layer and the substrate, in the first hologram element. The second hologram layer is provided between the fourth hologram layer and the substrate, in the second hologram element. In this case, the interval between the third hologram layer and the fourth hologram layer and the interval between the first hologram element and the second hologram layer are equal to each other.

In the specific mode, the third hologram layer has an interference fringe, the fourth hologram layer has an interference fringe, the inclination direction of the interference fringe in the first hologram layer is mirror symmetric with an inclination direction of the interference fringe in the third hologram layer, and the inclination direction of the interference fringe in the second hologram layer is mirror symmetric with an inclination direction of the interference fringe in the fourth hologram layer. The inclination direction of the interference fringe in both the hologram layers corresponds to the angle at which the diffracted light is deflected.

In the specific mode, there are further included a third hologram element and a fourth hologram element that correspond to a second wavelength band being a wavelength band shorter than the first wavelength band and a fifth hologram element and a sixth hologram element that correspond to a third wavelength band being a wavelength longer than the first wavelength band. In this case, a luminous flux width of the imaging light can be enlarged for the first wavelength band, the second wavelength band, and the third wavelength band, and hence the pupil can be enlarged for the colored imaging light.

A virtual image display device in a specific mode includes an image light generation unit configured to generate imaging light, and the optical element described above. The optical element emits the imaging light to a position at which an exit pupil is formed, the imaging light being emitted from the image light generation unit.

What is claimed is:
1. An optical element, comprising:
   a substrate;
   a first hologram element provided on one side of the substrate;
   a second hologram element provided on another side of the substrate;
   a third hologram element and a fourth hologram element that correspond to a second wavelength band, the second wavelength band being a shorter wavelength band than the first wavelength band; and
   a fifth hologram element and a sixth hologram element that correspond to a third wavelength band, the third wavelength band being a longer wavelength band than the first wavelength band, wherein
   the first hologram element includes a first hologram layer that diffracts part of incident light in a first wavelength band and that transmits another part of the incident light in the first wavelength band, and the second hologram element includes a second hologram layer that diffracts, toward the first hologram layer, part of the light in the first wavelength band, transmitted through the first hologram layer, and that transmits another part of the light in the first wavelength band, transmitted through the first hologram layer.

2. The optical element according to claim 1, wherein the first hologram element has a transmittance from 5% to 50%, and the second hologram element has a transmittance from 5% to 50%.

3. The optical element according to claim 1, wherein a size of a region provided with the first hologram element is equal to a size of a region provided with the second hologram element.

4. The optical element according to claim 1, wherein the first hologram layer has an interference fringe, the second hologram layer has an interference fringe, and an inclination direction of the interference fringe in the first hologram layer is identical to an inclination direction of the interference fringe in the second hologram layer.

5. The optical element according to claim 4, wherein a periodic interval of the interference fringe in the first hologram layer is identical to a periodic interval of the interference fringe in the second hologram layer.

6. A virtual image display device, comprising:
an image light generation unit configured to generate imaging light; and
the optical element according to claim 1, wherein the optical element emits, to a position where an exit pupil is formed, the imaging light emitted from the image light generation unit.

7. An optical element, comprising:
a substrate;
a first hologram element provided on one side of the substrate; and
a second hologram element provided on another side of the substrate, wherein
the first hologram element includes a first hologram layer that diffracts part of incident light in a first wavelength band and that transmits another part of the incident light in the first wavelength band, and
the second hologram element includes a second hologram layer that diffracts, toward the first hologram layer, part of the light in the first wavelength band, transmitted through the first hologram layer, and that transmits another part of the light in the first wavelength band, transmitted through the first hologram layer,
the first hologram element includes a third hologram layer different from the first hologram layer,
the second hologram element includes a fourth hologram layer different from the second hologram layer,
the third hologram layer diffracts part of incident light in the first wavelength band and transmits another part of the incident light in the first wavelength band,
the fourth hologram layer diffracts, toward the third hologram layer, part of the light in the first wavelength band, transmitted through the third hologram layer, and transmits another part of the light in the first wavelength band, transmitted through the third hologram layer,
the second hologram layer diffracts the part of the light in the first wavelength band, transmitted through the first hologram layer, to propagate the light in the first wavelength band in a state of being inclined in a first direction, and
the fourth hologram layer diffracts the part of the light in the first wavelength band, transmitted through the third hologram layer, to propagate the light in the first wavelength band in a state of being inclined in a second direction opposite to the first direction.

8. The optical element according to claim 7, wherein in the first hologram element, the third hologram layer is provided between the first hologram layer and the substrate, and
in the second hologram element, the second hologram layer is provided between the fourth hologram layer and the substrate.

9. The optical element according to claim 7, wherein the third hologram layer has an interference fringe, the fourth hologram layer has an interference fringe, the inclination direction of the interference fringe in the first hologram layer is mirror symmetric with an inclination direction of the interference fringe in the third hologram layer, and
the inclination direction of the interference fringe in the second hologram layer is mirror symmetric with an inclination direction of the interference fringe in the fourth hologram layer.

* * * * *